US012725359B1

(12) United States Patent
Mammou

(10) Patent No.: US 12,725,359 B1
(45) Date of Patent: Sep. 1, 2026

(54) TRIANGLE FAN CORNER ATTRIBUTE INDICES COMPRESSION

(71) Applicant: Apple Inc., Cupertino, CA (US)

(72) Inventor: Khaled Mammou, Danville, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 18/932,464

(22) Filed: Oct. 30, 2024

Related U.S. Application Data

(60) Provisional application No. 63/594,722, filed on Oct. 31, 2023.

(51) Int. Cl.
*G06T 17/20* (2006.01)
*G06T 9/00* (2006.01)
*G06T 15/04* (2011.01)

(52) U.S. Cl.
CPC ................ *G06T 17/20* (2013.01); *G06T 9/00* (2013.01); *G06T 15/04* (2013.01); *G06T 2210/36* (2013.01); *G06T 2210/56* (2013.01)

(58) Field of Classification Search
CPC ........... G06T 17/20; G06T 9/00; G06T 15/04; G06T 2210/36; G06T 2210/56
USPC .......................................................... 345/420
See application file for complete search history.

(56) References Cited

U.S. PATENT DOCUMENTS 11,393,132 B2 * 7/2022 Faramarzi ............... G06T 9/001
12,205,333 B2 * 1/2025 Schwarz ................ H04N 19/70
2020/0286261 A1 * 9/2020 Faramarzi ............... G06T 9/001
2024/0298030 A1 9/2024 Zakharchenko et al.
2024/0338857 A1 10/2024 Park et al.
2024/0430471 A1 12/2024 Tian et al.
2025/0117965 A1 4/2025 Kim et al.

FOREIGN PATENT DOCUMENTS

CN 112819108 B 7/2021
CN 114445596 B 7/2022
CN 113781507 B 3/2023
CN 116260649 A 5/2025

OTHER PUBLICATIONS

U.S. Appl. No. 18/932,493, filed Oct. 30, 2024, Khaled Mammou.
U.S. Appl. No. 18/932,499, filed Oct. 30, 2024, Khaled Mammou.
U.S. Appl. No. 18/932,460, filed Oct. 30, 2024, Khaled Mammou.
U.S. Appl. No. 18/932,469, filed Oct. 30, 2024, Khaled Mammou.
U.S. Appl. No. 18/932,476, filed Oct. 30, 2024, Khaled Mammou.

* cited by examiner

*Primary Examiner* — Sheree N Brown
(74) *Attorney, Agent, or Firm* — Alexander A. Knapp; Kowert, Hood, Munyon, Rankin & Goetzel, P.C.

(57) ABSTRACT

Mesh encoder and decoders are disclosed, wherein attributes associated with mesh vertices are encoded using an attribute indices encoder, an attribute traverser, and an attribute vectors encoder. The indices encoder may re-order the attribute indices to improve compression and generate associated reordering information. Additionally, the attribute vector encoder predicts attribute vector values based on already processed (e.g. encoded or decoded) attribute vectors and signals prediction configurations and prediction residuals to be used to reconstruct the attribute vectors.

20 Claims, 11 Drawing Sheets

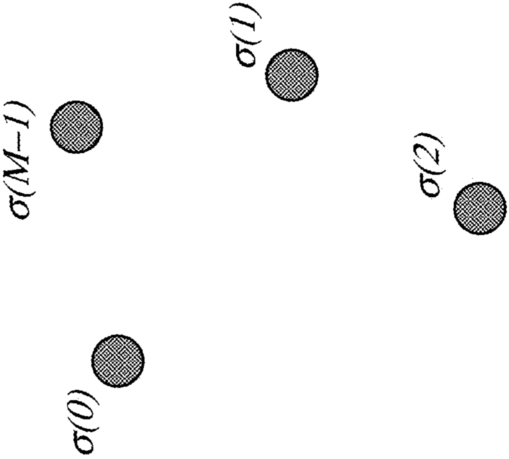
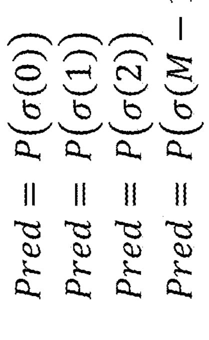
FIG. 8A
p
a0
$$Pred = P(a0)$$
FIG. 8B
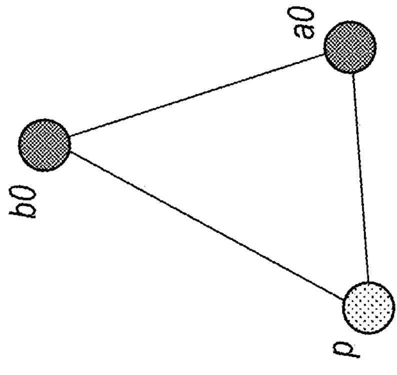
$$Pred = \frac{P(a0) + P(b0)}{2}$$
FIG. 8C $$SPred0 = \frac{1}{2}\left(P(a0) + 2P(b0) - P(c0)\right)$$

$$SPred1 = \frac{1}{32}\left(24P(a0) + 29P(b0) - 21\,P(c0)\right)$$

$$SPred2 = \frac{1}{32}\left(14P(a0) + 23P(b0) - 5\,P(c0)\right)$$

$$SPred3 = \frac{P(a0) + P(b0)}{2}$$

$$SPred4 = P(a0) + P(b0) - P(c0)$$

$$SPred5 = P(b0)$$

$$SPred6 = P(a0)$$

$$MPred0 = \frac{1}{32}\left(2\left(P(a0)+P(a1)\right)+20\left(P(b0)+P(b1)\right)-6\left(P(c0)+P(c1)\right)\right)$$
$$MPred1 = \frac{1}{32}\left(4\left(P(a0)+P(a1)\right)+21\left(P(b0)+P(b1)\right)-9\left(P(c0)+P(c1)\right)\right)$$
$$MPred2 = \frac{1}{32}\left(11\left(P(a0)+P(a1)\right)+18\left(P(b0)+P(b1)\right)-13\left(P(c0)+P(c1)\right)\right)$$
$$MPred3 = \frac{1}{32}\left(5\left(P(a0)+P(a1)\right)+18\left(P(b0)+P(b1)\right)-7\left(P(c0)+P(c1)\right)\right)$$
$$MPred4 = \frac{1}{32}\left(\left(P(a0)+P(a1)\right)+22\left(P(b0)+P(b1)\right)-7\left(P(c0)+P(c1)\right)\right)$$
$$MPred5 = \frac{1}{2}\left(P(b0)+P(b1)\right)$$
$$MPred6 = \frac{1}{32}\left(6\left(P(a0)+P(a1)\right)+21\left(P(b0)+P(b1)\right)-11\left(P(c0)+P(c1)\right)\right)$$
$$MPred7 = \frac{1}{2}\left(\left(P(a0)+P(a1)\right)+\left(P(b0)+P(b1)\right)-\left(P(c0)+P(c1)\right)\right)$$
$$MPred8 = -\frac{1}{2}\left(P(a0)+P(a1)\right)+P(b0)+P(b1)$$
$$MPred9 = P(a0)+P(b0)-P(c0)$$
$$MPred10 = P(a1)+P(b1)-P(c1)$$

FIG. 8E

TRIANGLE FAN CORNER ATTRIBUTE INDICES COMPRESSION

PRIORITY CLAIM

This application claims benefit of priority to U.S. Provisional Application Ser. No. 63/594,722, entitled "Corner Attribute Connectivity Compression; Corner Attribute Traversal and Prediction Neighborhood Information Derivation; and Corner Attribute Compression," filed Oct. 31, 2023, and which is incorporated herein by reference in its entirety.

BACKGROUND

Technical Field

This disclosure relates generally to encoding and decoding of attribute information for three-dimensional meshes having associated textures or attributes.

Description of the Related Art

Various types of sensors, such as light detection and ranging (LIDAR) systems, 3-D-cameras, 3-D scanners, etc. may capture data indicating positions of points in three-dimensional space, for example positions in the X, Y, and Z planes. Also, such systems may further capture attribute information in addition to spatial information for the respective points, such as color information (e.g., RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up volumetric visual content comprising mesh vertices each having associated spatial information and one or more associated attributes. In some circumstances, visual volumetric content may be generated, for example in software, as opposed to being captured by one or more sensors. In either case, such visual volumetric content may include large amounts of data and may be costly and time-consuming to store and transmit.

Such visual volumetric content may be represented by a three-dimensional mesh comprising a plurality of polygons (such as triangles) with connected vertices that model a surface of visual volumetric content. Moreover, texture or other attribute values may be overlaid on the mesh to represent the attributes of the visual volumetric content when modelled as a three-dimensional mesh.

SUMMARY OF EMBODIMENTS

In some embodiments, a system may include one or more computing devices storing program instructions, that when executed, cause the one or more computing devices to encode an attribute indices bitstream configured to be decoded to reconstruct volumetric visual content. The system may obtain mesh geometry information for volumetric visual content, wherein the mesh geometry information may include position information for a plurality of vertices, geometry connectivity information for forming polygons using the plurality of vertices, and geometry indices for the plurality of vertices. In some embodiments, a non-transitory computer-readable medium stores program instructions, that when executed, may encode and decode attribute information used to generate the visual volumetric content. The attribute information may include attribute connectivity information and attribute indices for associating attribute values (e.g., attribute vectors) with a plurality of vertices of the mesh geometry information. For example, attribute values such as attribute vectors, may be two-dimensional (2D) texture coordinates that indicate pixel coordinates in a 2D texture image frame that are to be associated with respective ones of the mesh vertices in a reconstructed representation of the visual volumetric content. The attribute indices for the 2D texture coordinates may indicate how the texture coordinates (or other attribute vectors) are to be associated with the plurality of vertices of a reconstructed mesh of the visual volumetric content. In some embodiments, the 2D texture image may be an image of an unfolded three-dimensional (3D) mesh that may be mapped to corresponding 3D mesh portions in the geometric representation.

In some embodiments, multiple ones of the attribute vectors that have the same values may be associated with a same geometry index of the geometry indices for the plurality of vertices. This may particularly be the case for "corner" attributes or a set of attribute values associated with corners of mesh faces. For example, in some embodiments, a 2D texture image in the attribute information may be a "cut" or flattened version of a 3D mesh. For example, a cube shaped 3D mesh may be cut along some edges and may be represented in a 2D form using six squares that are arranged adjacently (as shown in FIG. 2). In some embodiments, a vertex in a 3D mesh may be associated with multiple vertices included in 2D texture images when cut along an edge containing the vertex. Because a vertex in the 3D mesh may be represented now in multiple vertices in the 3D image, there may be multiple attribute indices that are associated the attribute of the vertex. Encoding and decoding of corner attributes efficiently may not be trivial as such corner attributes with discontinuities along the edges of the mesh may require specialized encoding processes. For example, various codecs, such as a triangular fan (TFAN) codec, may not support corner attributes coding. Such codecs that lack support for corner attributes coding may furthermore be prevented from being compatible with other scene description formats, including commonly used 3D scene description formats such as Universal Scene Description (USD) format or Graphics Library Transmission Format (glTF).

In some embodiments, to encode the attribute information (e.g., compress the attribute information), the program instructions, when executed using one or more processors, may cause the one or more processors to determine vertex to attribute mappings between respective ones of a plurality of vertices from the mesh geometry information and respective ones of the attribute indices based on the geometry indices of the plurality of vertices. In some embodiments, the vertex to attribute mappings may be determined based on a traversal order for the geometry indices. The program instructions may furthermore include instructions to determine, for respective ones of the plurality of vertices, respective quantities of attribute indices associated with the respective ones of the plurality of vertices, for example to encode information indicating the respective quantities of attribute indices associated with the respective ones of the plurality of vertices. The attribute indices also may be encoded using the vertex to attribute mappings and the quantities of attribute indices.

In some embodiments, to encode the attribute information, the program instructions, when executed using one or more processors may cause the one or more processors to obtain mesh geometry information for volumetric visual content, wherein the mesh geometry information comprises position information for a plurality of vertices, geometry connectivity information for forming polygons using the plurality of vertices, and geometry indices for the plurality of vertices. The program instruction may furthermore include instructions to obtain attribute information for the volumetric visual content, wherein the attribute information comprises attribute connectivity information for associating attribute vectors with the plurality of vertices and also comprises attribute indices for the attribute vectors. The program instruction may furthermore include instructions to generate a data structure representing the polygons using the mesh geometry information, wherein the data structure indicates for respective corners of the polygons, respective corner indices, respective vertices of the plurality of vertices, and relationships between the respective corners and other corners adjacent to the respective corners. Based on the data structure, the attribute indices may be encoded using a traversal order for the respective corners of the polygons, wherein the encoded attribute indices are arranged according to the traversal order.

In some embodiments, in order to compress an attribute vectors bitstream, an encoding order for attribute vectors and prediction neighborhood information may be determined. To determine the encoding order for attribute vectors and the prediction neighborhood information, the program instructions, when executed using one or more processors, may cause the one or more processors to obtain mesh geometry information for volumetric visual content, wherein the mesh geometry information comprises: position information for a plurality of vertices, geometry connectivity information for forming polygons using the plurality of vertices, and geometry indices for the plurality of vertices. The program instructions may include instructions to determine a traversal order for the respective corners of the polygons and obtain attribute information for the volumetric visual content, wherein the attribute information comprises attribute values, attribute connectivity information for associating the attribute values with the plurality of vertices, and attribute indices for the attribute values. The program instructions may furthermore include instructions to obtain attribute indices reordering information, reorder the attribute indices using the attribute indices reordering information, and determine an encoding order of the attribute indices used to compress the attribute values based on the traversal order. To determine the prediction neighborhood information, the program instructions, when executed using one or more processors, may further cause the one or more processors to generate a data structure representing the polygons using the mesh geometry information, wherein the data structure indicates for respective corners of the polygons, respective corner indices, respective corner vertices of the respective corners, and relationships between the respective corners and corners adjacent to the respective corners. The program instructions may also include instructions to determine attribute prediction information that indicates a quantity of encoded attribute values for neighboring vertices of a given vertex of a given corner of the polygons, wherein the attribute prediction information comprises an index value of the given vertex for which the attribute prediction is to be performed, attribute indices associated with the given vertex for which the attribute prediction is to be performed, and vertex indices associated with the one or more attribute indices that are associated with the given vertex for which the attribute prediction is to be performed.

In some embodiments, attribute prediction may utilize prediction configurations to predict attribute values for seed vertices of connected components, based on already processed attribute values of other seed vertices of other connected components included in the visual volumetric content. In some embodiments, attribute prediction may further be guided by geometry, wherein prediction configurations for predicting attribute values for vertices within a connected component are predicted using a selected prediction configuration corresponding to a geometry type of the portion of the connected component for which attribute values are being predicted. In some embodiments, geometry information may further be used to guide prediction of unitary attribute vectors.

BRIEF DESCRIPTION OF THE DRAWINGS

FIG. 8A-8E illustrate attribute prediction configurations for predicting an attribute value for a vertex of a triangle, according to some embodiments.

Figure 1:
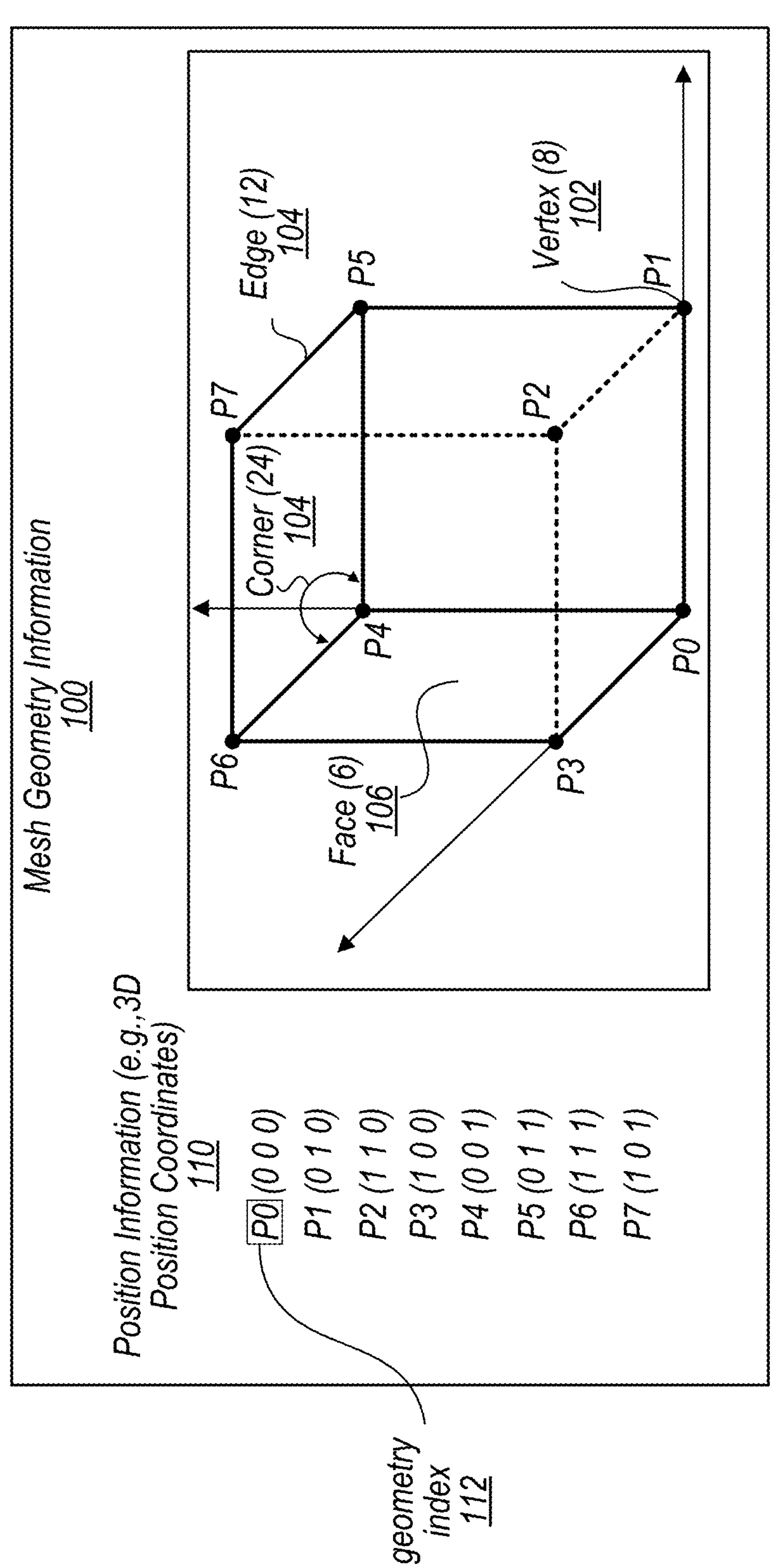
FIG. 1 illustrates example mesh geometry information for visual volumetric content that may be used to encode/decode corner attributes, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture visual volumetric content comprising thousands or millions of points in 2-D or 3-D space, such as via LIDAR systems, has increased. Large visual volumetric content files may be costly and time-consuming to store and transmit. For example, communication of visual volumetric content over the Internet requires time and network resources, resulting in latency.

In some embodiments, an encoder generates compressed visual volumetric content to reduce costs and time associated with storing and transmitting visual volumetric content. In some embodiments, a system may include an encoder that compresses attribute and/or spatial information of a visual volumetric content file such that the visual volumetric content file may be stored and transmitted more quickly than non-compressed visual volumetric content and in a manner that the visual volumetric content file may occupy less storage space than non-compressed visual volumetric content. In some embodiments, compression of attributes for vertices in visual volumetric content may enable the visual volumetric content to be communicated over a network in real-time or in near real-time. For example, a system may include a sensor that captures attribute information about points in an environment where the sensor is located, wherein the captured points and corresponding attributes make up visual volumetric content. The system may also include an encoder that compresses the captured visual volumetric content attribute information. The compressed attribute information of the visual volumetric content may be sent over a network in real-time or near real-time to a decoder that decompresses the compressed attribute information of the visual volumetric content. The decompressed visual volumetric content may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a visual volumetric content may be sent with compressed spatial information for the visual volumetric content, such as an encoded mesh. In other embodiments, spatial information and attribute information may be separately encoded and/or separately transmitted to a decoder.

In some embodiments, a system may include a decoder that receives one or more sets of visual volumetric content data comprising compressed attribute information via a network from a remote server or other storage device that stores the one or more visual volumetric content files. For example, a 3-D display, a holographic display, or a head-mounted display may be manipulated in real-time or near real-time to show different portions of a virtual world represented by visual volumetric content. In order to update the 3-D display, the holographic display, or the head-mounted display, a system associated with the decoder may request visual volumetric content data from the remote server based on user manipulations of the displays, and the visual volumetric content data may be transmitted from the remote server to the decoder and decoded by the decoder in real-time or near real-time. The displays may then be updated with updated visual volumetric content data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, texture attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in visual volumetric content. For example, in some embodiments, a gyroscope or accelerometer, may capture motion information to be included in visual volumetric content as an attribute associated with one or more mesh vertices of the visual volumetric content. For example, a vehicle equipped with a LIDAR system, a 3-D camera, or a 3-D scanner may include the vehicle's direction and speed in visual volumetric content captured by the LIDAR system, the 3-D camera, or the 3-D scanner. For example, when points in a view of the vehicle are captured, they may be included in visual volumetric content, wherein the visual volumetric content includes mesh information representing the captured points and associated motion information corresponding to a state of the vehicle when the points were captured.

In some embodiments, multiple ones of the attribute vectors that have the same values may be associated with a same geometry index of the geometry indices for the plurality of vertices. This may particularly be the case for corner attributes. For example, as explained above, a vertex in a 3D mesh may be associated with multiple vertices of 2D texture images when cut along an edge containing the vertex. Because a vertex in the 3D mesh may be represented now in multiple vertices in the 3D image, there may be multiple attribute indices that are associated with the attribute of the vertex. Furthermore, multiple values of differing types of attribute information, such as texture coordinates, normal vectors, color information (e.g., RGB values, YCbCr values, etc.), may be associated with same ones of the mesh vertices. Efficient encoding of such corner attributes may be required to improve overall compression efficiency of visual volumetric content.

While several of the examples described herein focus on compressing and decompressing texture coordinates using geometry information guided prediction, in some embodiments, the same techniques described herein may be applied to compress and decompress any attribute values using geometry information guided prediction.

FIG. 1 illustrates an example mesh geometry information for visual volumetric content that may be used to encode/decode corner attributes, according to some embodiments.

For example, in some embodiments, a mesh geometry information 100 may comprise a plurality of vertices, geometry connectivity information for forming polygons using the plurality of vertices, and geometry indices. In some embodiments, the connectivity information may include a series of geometry indices that indicate which of the vertices are connected to form edges of the polygons. Moreover, in some embodiments, the geometry indices may indicate which of the attribute vectors (e.g., the 3D position coordinates) are associated with a given vertex of the plurality of vertices. For example, a vertex 102 having a geometry index 112 "P1" is connected to vertex having index P0 to form an edge. In another example, a vertex P5 may connect to vertex P7 to form an edge 104. The mesh geometry information 100 may furthermore comprise position information 110 such as three-dimensional (3D) position coordinates indicating locations of the plurality of plurality of vertices 102. In FIG. 1, the plurality of vertices 102 and the connectivity information are associated with a 3D cube having eight vertices P0-P7, twelve edges, twenty-four corners, and six faces. In some embodiments, the angle of corners may be provided or be calculated using the position information 110 and the connectivity information.

Figure 2:
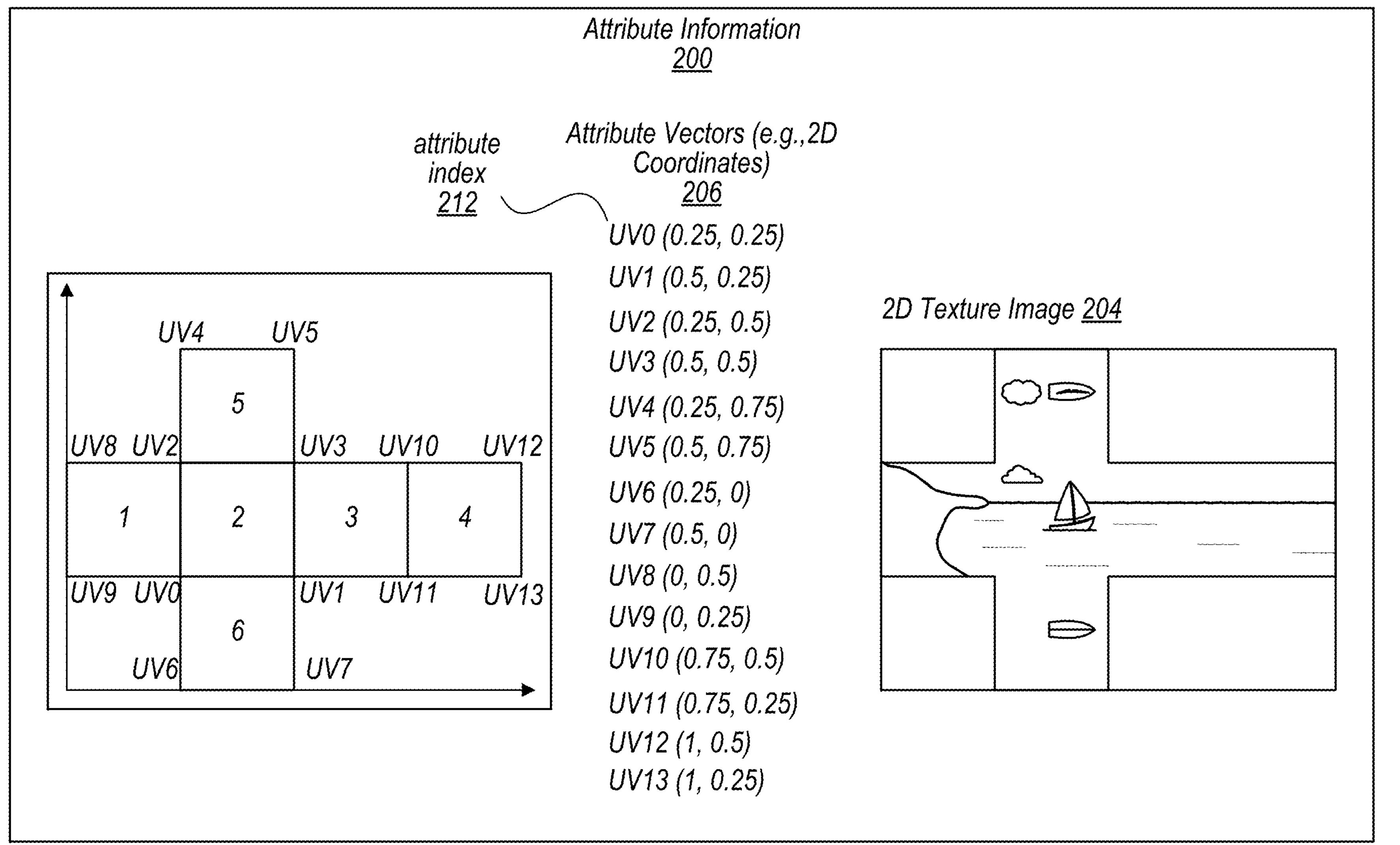
FIG. 2 illustrates example attribute information that may be used to encode/decode corner attributes, according to some embodiments.

FIG. 2 illustrates an example of attribute information that may be used to encode/decode corner attributes, according to some embodiments.

In some embodiments, attribute information 200 for volumetric visual content may comprise attribute vectors 206, attribute indices for the attribute vectors, and attribute connectivity information for associating attribute vectors with the plurality of geometry vertices. For example, the attribute vectors may be coordinates of a two-dimensional (2D) texture image 204. The attribute indices may be used to indicate which of the attribute vectors (e.g., the 2D coordinates) are associated with which corresponding geometry vertices of a mesh geometry information. For example, attribute index 212 "UV0" may be used to indicate that coordinate (0.25, 0.25) is associated with vertex P0 of corresponding mesh geometry information as further discussed in FIG. 3.

Figure 3:
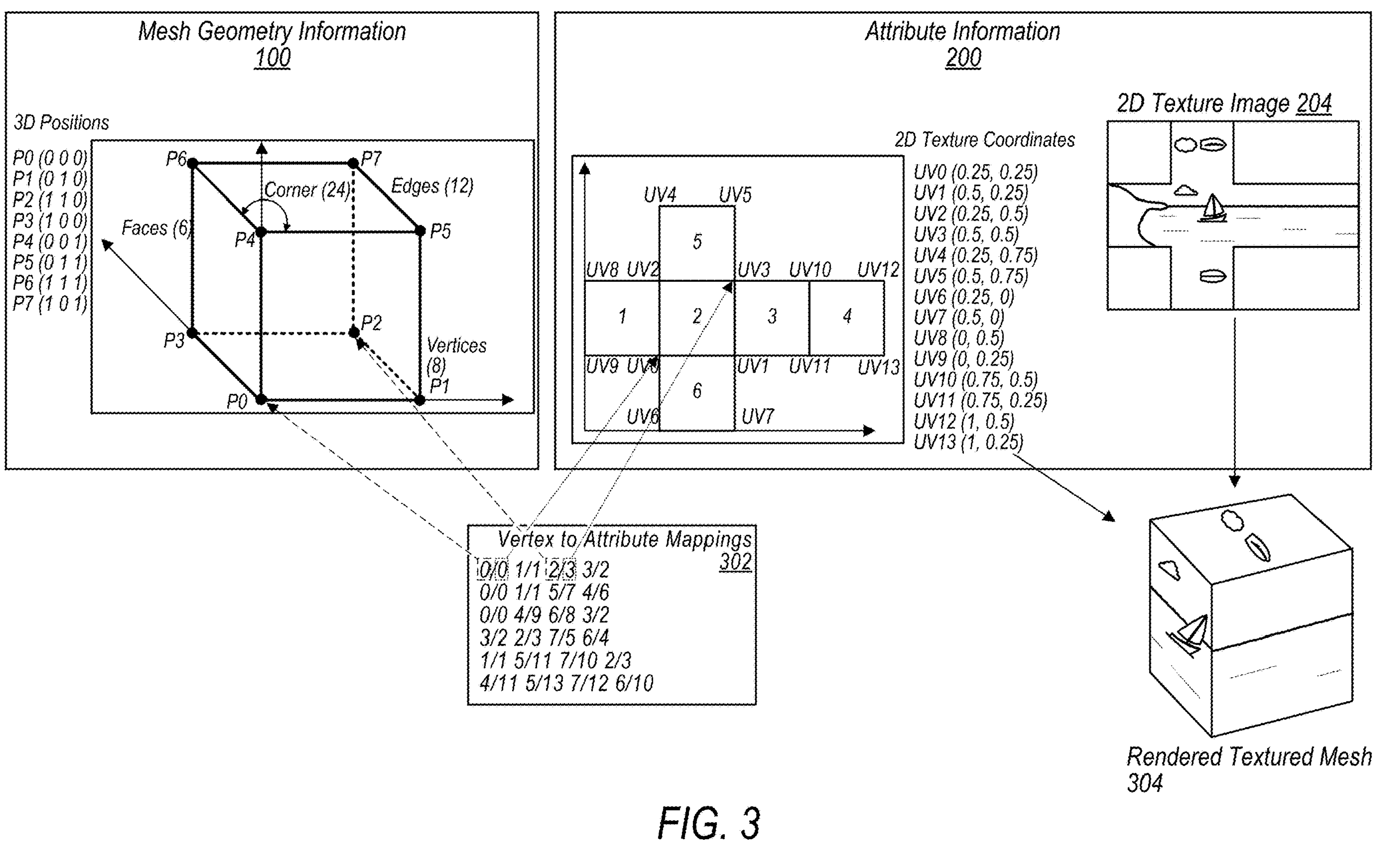
FIG. 3 illustrates an example process of using mesh geometry information, attribute information, and vertex to attribute mappings to encode/decode corner attributes to reconstruct a representation of volumetric visual content, according to some embodiments.

FIG. 3 illustrates an example process of using mesh geometry information, attribute information and vertex to attribute mappings to encode/decode corner attributes to reconstruct volumetric visual content, according to some embodiments.

In some embodiments, vertex to attribute mappings 302 may describe the relationship between a plurality of geometry vertices of a mesh geometry information 100 with a plurality of attribute values, including attribute vectors (e.g., 2D texture coordinates), of an attribute information for volumetric visual content. For example, the vertex to attribute mappings 302 may indicate that a vertex having index P0 at position vector (0 0 0) may be associated with attribute index UV0 with attribute vector (0.25, 0.25). The vertex to attribute mappings 302 may furthermore indicate that a vertex having geometry index P2 is associated with an attribute index UV3. In some embodiments, the a 2D texture image may be an image 204 of an unfolded three-dimensional (3D) mesh wherein multiple ones of the coordinates of the 2D texture image are associated with a same geometry index of the geometry indices for the plurality of vertices. For example, attribute indices UV6, UV9, and UV13 indicating attribute vectors (0.25, 0), (0, 0.25), and (1, 0.25) respectively may be associated with a same geometry vertex P4 at position (0 0 1). In some embodiments, the mesh geometry information 100 and the attribute information 200 may be mapped using the vertex to attribute mappings 302 to generate a rendered textured mesh 304.

In some embodiments, one or more portions of the mesh geometry information 100, attribute information 200, and the vertex to attribute mappings 302 may be encoded to generate an encoded attribute indices bitstream to compress the relevant attribute and/or geometry information of a visual volumetric content file such that the visual volumetric content file may be stored and transmitted more quickly than a non-compressed visual volumetric content and in a manner that the visual volumetric content file may occupy less storage space than non-compressed visual volumetric content. In some embodiments, encoding of attributes for vertices in visual volumetric content may enable the visual volumetric content to be communicated over a network in real-time or in near real-time. For example, a system may include a sensor that captures attribute information about points in an environment where the sensor is located, wherein the captured points and corresponding attributes make up visual volumetric content. The system may also include an encoder that encodes the captured visual volumetric content attribute information. The encoded attribute information of the visual volumetric content may be sent over a network in real-time or near real-time to a decoder that decodes the encoded attribute information of the visual volumetric content. The decoded visual volumetric content may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decoded attribute information may be displayed or otherwise used by the augmented reality system. In some embodiments, encoded attribute information for a visual volumetric content may be sent with encoded spatial information for the visual volumetric content, such as an encoded mesh. In other embodiments, spatial information and attribute information may be separately encoded and/or separately transmitted to a decoder.

Encoding Corner Attribute Indices Using Quantities of Attribute Indices and Vertex to Attribute Mappings In some embodiments, an attribute indices encoder (further discussed in FIG. 6) may generate an encoded attribute indices bitstream, wherein the attribute indices bitstream is configured to be decoded in order to reconstruct a volumetric visual content. In some embodiments, to generate an encoded attribute indices bitstream, the attribute indices encoder may determine vertex to attribute mappings, wherein the vertex attribute mappings may store for each vertex v of the geometry vertices, attribute indices of the attribute vectors associated with the vertex.

In some embodiments, the attribute indices encoder may determine respective quantities of attribute indices associated with the respective ones of the plurality of vertices (|∇(v)|) for respective attribute indices (∇(v)). For instance, in FIG. 3, a vertex having index value v=4 ("P4", or "vertex 4") has three attributes (e.g., attribute "a", a0=6, a1=9, and a1=13) associated with the vertex. The attribute indices and quantity of attribute indices associated with associated with the geometry vertex 4 may be expressed as follows:

$$\nabla(4) = \{6, 9, 13\} \text{ and } |\nabla(4)| = 3.$$

In some embodiments, the attribute indices encoder may determine the relationship between the plurality of geometry vertices, attribute indices, and quantities of attribute indices associated with the respective ones of the geometry indices. In some embodiments, the relationship may be expressed using a following table data structure.

| v | ∇(v) | \|∇(v)\| |
|---|---|---|
| 0 | 0 | 1 |
| 1 | 1 | 1 |
| 2 | 3 | 1 |
| 3 | 2 | 1 |
| 4 | 6, 9, 13 | 3 |
| 5 | 7, 11 | 2 |
| 6 | 8, 4, 12 | 3 |
| 7 | 5, 10 | 2 |

In some embodiments, the attribute indices encoder may determine the vertex to attribute mappings between respective ones of the plurality of vertices and respective ones of the attribute indices by traversing the geometry vertices according to a traversal order. For example, the attribute indices encoder may determine the vertex to attribute mappings by traversing mesh faces of the mesh geometry information 100 according to a traversal order as determined by a geometry encoder. In some embodiments, geometry indices used for the vertex to attribute mappings may be a reordered geometry indices that has been reordered by the geometry encoder in generating a compressed geometry bitstream.

In some embodiments vertex to attribute mapping may be a sequence of attribute indices. For example, the mesh faces (or the reordered mesh faces) may be traversed according to the traversal order, and for each corner of the face the vertex v(h) and attribute index i(h) of the face may be determined. If the attribute index i(h) has already been added to the vertex to attribute mapping (e.g., the indices sequence), the attribute index would not be added. If the attribute index i(h) has not been added to the vertex to attribute mapping i(h) is appended to the vertex to attribute mapping as ∇(v(h)). In some embodiments, the attribute indices encoder may traverse the attribute indices (and therefore add the attribute indices) in the traversal order.

In some embodiments, to generate an encoded attribute indices bitstream, the attribute indices encoder may encode information indicating the respective quantities of attribute indices associated with the respective ones of the plurality of vertices. For example, the attribute indices encoder may determine the number of the faces |F(v)| incident to each vertex v of the plurality of geometry vertices. The attribute indices encoder may determine that lowest (minimum) quantity of attributes associated with any of the plurality of geometry vertices ($N_{min}$) and highest (maximum) quantity of attributes associated with any of the plurality of geometry vertices ($N_{max}$) are to be defined as follows:

$$N_{min} = \min_v(|\nabla(v)|), \text{ and } N_{max} = \min_v(|\nabla(v)|).$$

The attribute indices encoder may determine a range of the respective quantities of attribute indices associated with the plurality of vertices (R), wherein $$R = N_{max} - N_{min}.$$

In some embodiments, the attribute indices encoder may encode the lowest quantity of the respective quantities of attribute indices associated with the plurality of vertices and the range of the respective quantities of attribute indices into the attribute indices bitstream. In some embodiments, the $N_{min}$ and R may be encoded into the attribute indices bitstream using one or more entropy encoders. In some embodiments, entropy encoders may include one or more different types of entry encoders such as exponential golomb coding, context adaptive binary arithmetic coding with truncated unary codes, etc.

In some embodiments, for each vertex v, the attribute indices encoder may encode quantities of associated attributes indices for each of the geometry indices for the plurality of vertices, wherein the attribute indices encoder encodes |∇(v)| into the attribute indices bitstream. In some embodiments, the attribute indices encoder may reduce the reduced each one of the quantities of attributes associated with the geometry indices by the lowest quantity of attributes (|∇(v)|−$N_{min}$) to further compress the information being encoded by exploiting the fact that attribute indices fall between 0 and R. In some embodiments, truncated unary coding may be used as described in the following.

| N | Unary (U) | Truncated Unary (TrU) cMax = 7 |
|---|---|---|
| 0 | 0 | 0 |
| 1 | 10 | 10 |
| 2 | 110 | 110 |
| 3 | 1110 | 1110 |
| 4 | 11110 | 11110 |

-continued

| N | Unary (U) | Truncated Unary (TrU) cMax = 7 |
|---|---|---|
| 5 | 111110 | 111110 |
| 6 | 1111110 | 1111110 |
| 7 | 11111110 | 1111111 |

In some embodiments, to generate an encoded attribute indices bitstream, the attribute indices encoder may reorder attribute indices and encode updated vertex to attribute mappings. In some embodiments, the attribute indices encoder may determine an array M of size A, wherein A is equal to the total number of attribute indices in the attribute information 200. The attribute indices encoder may store a new index of an attribute vector in the array M after the reordering. Furthermore, the attribute indices encoder may determine an array $M^{-1}$ that is an inverse mapping of M.

In some embodiments, the attribute indices encoder may initialize $MM^{-1}=M=\{-1, -1, \ldots, -1\}$, and initialize an attribute counter C=0. In some embodiments, instead of the value −1, other values or symbol may indicate that an attribute index has not yet been visited in the traversal. For each vertex v, the attribute indices encoder may traverse the elements of $\nabla(v)=\{i(0), i(1), \ldots, i(|\nabla(v)|-1)\}$ and may determine whether an attribute index of the attribute indices associated with a given corner has been visited in the traversal. The attribute indices encoder may determine whether M(i(k))=−1 (or instead of −1, another indicator that indicates whether attribute i(k) has or has not been visited before) in the traversal.

Based on a determination that the attribute index has not been visited in the traversal, the attribute indices encoder may encode the value 1 (or another indicator) to indicate to the decoder that the next attribute is a new attribute. In some embodiments, based on the determination that attribute i(k) has not been visited before in the traversal, the attribute indices encoder may set M(i(k))=C, $M^{-1}(C)=i(k)$, and increment the counter C=C+1. In some embodiments, the value 1 (or other indicator) may indicate to the decoder that the next attribute is a new attribute may be encoded using one or more entropy encoders as discussed above.

In some embodiments, the attribute indices encoder may determine that M(i(k))≠1 (or another indicator that indicates that attribute i(k) has been visited before). Based on a determination that the attribute index has been visited in the traversal, the attribute indices encoder may encode the value 0 to indicate to the decoder that the next attribute is an old attribute. The attribute indices encoder may encode the value (C−M(i(k))−1) based on the determination that the attribute index has been visited in the traversal. In some embodiments, the value (C−M(i(k))−1) may be encoded using one or more entropy encoders as discussed above. During the traversal, the attribute indices encoder may determine that C<A and may determining that for i=0, . . . , A−1, if M(i)=−1 to set M(i(k))=C and $M^{-1}(C)=i(k)$. The attribute indices encoder may increment the counter C=C+1, and add the remaining attribute indices in an order that maximizes correlations between successive attributes.

In some embodiments, the attribute indices encoder may encode attribute indices into the encoded attribute indices bitstream. The attribute indices encoder may use the previously encoded vertex to attribute mapping and the encoded quantities of the attribute indices in order to encode the attribute indices into the bitstream. For example, as part of the encoding process, the attribute indices encoder may determine two array, S and L to be two arrays of size V, where V is the number of the vertices of the mesh geometry information 100. The attribute indices encoder may initialize $L=S=\{-1, -1, \ldots, -1\}$ (or instead of −1, another indicator that indicates whether attribute i(k) has not been visited before). In some embodiments, the attribute indices encoder may initiate traversal of the faces of the mesh and for each face, process its corners (v(h), i(h)). If the quantity of attribute indices associated with a given corner $|\nabla(v(h))|\leq 1$, the attribute indices encoder may proceed onto the next corner, but if the quantity of attribute indices associated with a given corner $|\nabla(v(h))|>1$ the attribute indices encoder may determine whether S(v(h))=−1 (or other indication that that this is the first time that the vertex is visited in the traversal). Based on the determination that the attribute index has not been visited in the traversal, the attribute indices encoder may set L(v(h))=0, and S(v(h))=0 given that i(h) is the first element of ∇(v(h)) (e.g., element at index 0 of array of attribute indices for the given vertex).

In some embodiments, based on the determination that the attribute index has been visited in the traversal, the attribute indices encoder may determine an index indicating a location of the attribute index in an array of attribute indices for a vertex of the plurality of vertices associated with the given corner. For example, the attribute indices encoder may determine the index k of i(h) in the list ∇(v(h)). In another example, the attribute indices encoder may determine index "1" for attribute index "9" given an array {6, 9, 13} for ∇(4). The attribute indices encoder may encode the determined index indicating the location of the attribute index into the encoded attribute indices bitstream. In some embodiments, the attribute indices encoder may encode the local index k by exploiting the following facts $k<|v(v(h))|$ and $k\leq S(v(h))+1$. The attribute indices encoder may then set L(v(h))=k, and S(v(h))=max {S(v(h)), k}.

Decoding Corner Attribute Indices Using Quantities of Attribute Indices and Vertex to Attribute Mappings In some embodiments, an encoded attribute indices bitstream may be used by a decoder to reconstruct a volumetric visual content. In some embodiments, the decoder may receive an encoded geometry bitstream, an encoded attribute vector bitstream, and an encoded attribute indices bitstream. To reconstruct a volumetric visual content, the decoder may decode the encoded geometry bitstream to determine mesh geometry information for volumetric visual content, wherein the mesh geometry information comprise position information for a plurality of vertices, geometry connectivity information for forming polygons using the plurality of vertices, and geometry indices for the plurality of vertices.

In some embodiments, the encoded attribute indices bitstream may comprise encoded information indicating respective quantities of attribute indices associated with the respective ones of the plurality of vertices, encoded information indicating vertex to attribute mappings, and encoded attribute indices. In some embodiments, the encoded information indicating respective quantities of attribute indices associated with the respective ones of the plurality of vertices, the encoded information indicating vertex to attribute mappings, and the encoded attribute indices may be determined using an encoding process described above.

To reconstruct a volumetric visual content, the decoder may decode $N_{min}$ and R from the bitstream to determine the lowest (minimum) quantity of attributes associated with any of the plurality of geometry vertices ($N_{min}$) and the range of the respective quantities of attribute indices associated with the plurality of vertices (R). In some embodiments, for each vertex v, the decoder may decode the number of its associated attributes indices, decode the value $(|\nabla(v)|-N_{min})$, while exploiting the fact that it is between 0 and R. As discussed above, the $N_{min}$ and R may be decoded from the attribute indices bitstream using one or more entropy encoders that were used in the encoding process (such as one or more different types of entry encoders such as exponential golomb coding, context adaptive binary arithmetic coding with truncated unary codes, etc.). The decoder may determine $|\nabla(v)|$ for each one of the geometry indices for the plurality of vertices by increase each of the quantities by $N_{min}$.

To reconstruct a volumetric visual content, the decoder may decode the vertex to attribute mappings. The decoder may initialize the attribute counter C=0, initialize $\nabla(v)=\{\ \}$, for v=0 . . . V−1. For each vertex v, the decoder may decode 1 bit from the bitstream and determine whether the decoded bit equals 1. Based on a determination that the decoded bit equals 1, the decoder may create a new attribute index i(k)=C+1, append i(k) to the end of $\nabla(v)$, and increment the counter C=C+1. Based on a determination that the decoded bit does not equal 1, the decoder reuses the existing attribute index i(k) and decode the value t from the bitstream to set i(k)=C+1+t (which is opposite of the encoding step wherein value, (C−M(i(k))−1), was encoded).

To reconstruct a volumetric visual content, the decoder may decode the attribute indices, while leveraging the previously decoded vertex to attribute mapping. In some embodiments, the decoder may determine two array, S and L to be two arrays of size V, where V is the number of the vertices of the mesh geometry information 100. The decoder may initialize L=S={−1, −1, . . . , −1} (or instead of −1, another indicator that indicates whether attribute i(k) has not been visited before, similar to the encoding process). In some embodiments, the decoder may initiate traversal of the faces of the mesh and for each face, process its corners (v(h), i(h)) according to the same traversal order for the geometry indices used in the encoding. If the quantity of attribute indices associated with a given corner $|\nabla(v(h))|\leq 1$, decoder may proceed onto the next corner, but if the quantity of attribute indices associated with a given corner $|\nabla(v(h))|>1$ the decoder may determine whether S(v(h))=−1 (or other indication that that this is the first time that the vertex is visited in the traversal). Based on the determination that the attribute index has not been visited in the traversal, the decoder may set L(v(h))=0, and S(v(h))=0 given that i(h) is the first element of $\nabla(v(h))$ (e.g., element at index 0 of array of attribute indices for the given vertex).

In some embodiments, based on the determination that the attribute index has been visited in the traversal, the decoder may decode from the attribute indices bitstream a local index k. The decoder may exploit the fact that $k<|\nabla(v(h))|$, and $k\leq S(v(h))+1$, because of the way the vertex to attribute mappings were computed on the encoder side and set i(h) to be equal to the k-th element of $\nabla(v(h))$. The decoder may determine, determination that the attribute index has been visited in the traversal, that L(v(h))=k, and S(v(h))=max {S(v(h)), k}. The decoder may reconstruct the volumetric visual content using the decoded attribute indices along with attribute vectors determined from decoding the encoded attribute vector bitstream and the mesh geometry information for volumetric visual content.

Encoding Corner Attribute Indices Using Corner Table Data Structure

Figure 4:
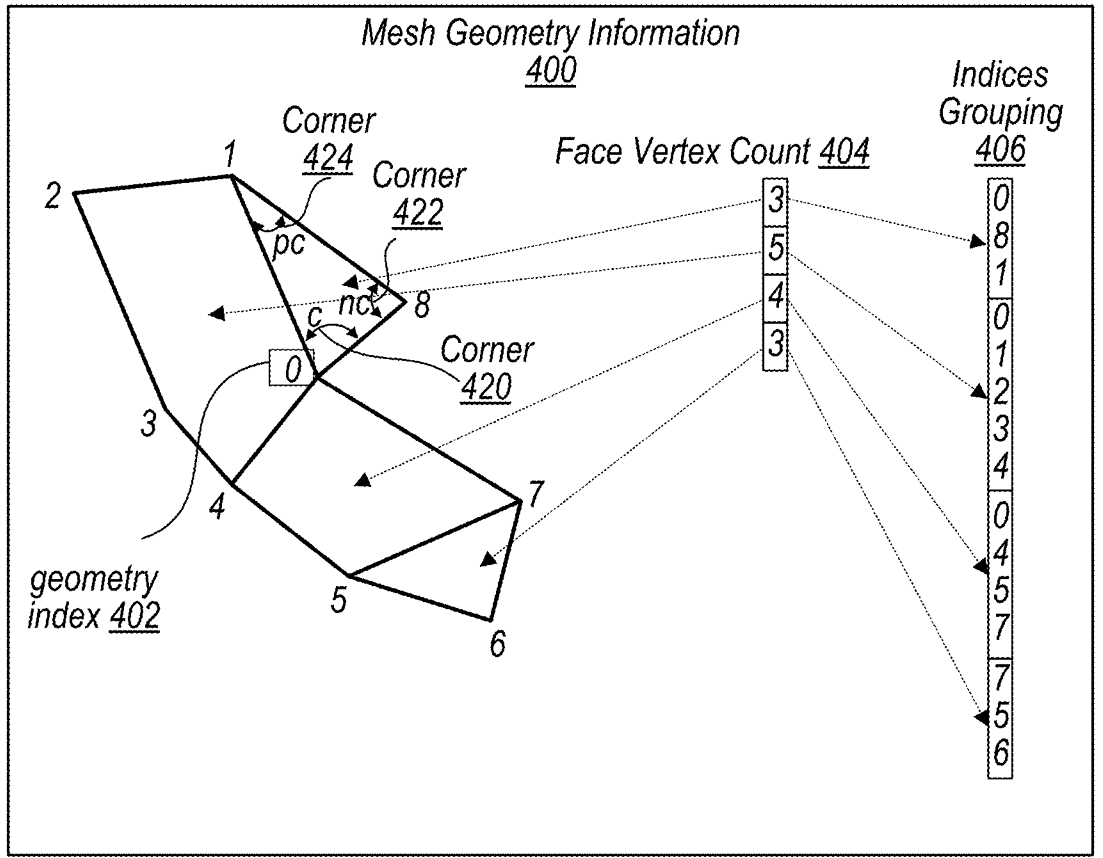
FIG. 4 illustrates example mesh geometry information for a polygonal mesh that contains different types of polygons that may be used to encode/decode corner attributes, according to some embodiments.

FIG. 4 illustrates an example mesh geometry information for polygonal mesh that contain different types of polygons that may be used to encode/decode corner attributes, according to some embodiments.

In some embodiments, an attribute indices encoder may obtain a mesh geometry information 400 comprising position information for a plurality of vertices, geometry connectivity information for forming polygons using the plurality of vertices, and geometry indices for the plurality of vertices non-manifold polygonal meshes. For example, the mesh geometry information 400 may indicate that geometry vertex having the geometry index "0" 402 may be in position as shown in FIG. 4. In some embodiments, the mesh geometry information 400 may include position coordinates for each of the vertices as shown in FIG. 1.

In some embodiments, the attribute indices encoder may generate an encoded attribute indices bitstream, wherein the attribute indices bitstream is configured to be decoded in order to reconstruct a volumetric visual content. To generate the encoded attribute indices bitstream, the attribute indices encoder may generate a data structure to describe various corners of the polygons. In some embodiments, the data structure (e.g., a corner table) may represent a connectivity information for a polygonal mesh, wherein the corner table indicates for respective corners of the polygons, respective corner indices, respective vertices of the plurality of vertices, and relationships between the respective corners and other corners adjacent to the respective corners. For example, the corner table may indicate the relationships between the respective corners such as the identity of a next corner "nc" 422 from a given corner "c" 420 according to a traversal order (e.g., corner to the right of the given corner) and a previous corner "pc" 424 from the given corner 420 according to the traversal order (e.g., corner to the left of the given corner). The traversal order may be based on based on a rule used in encoding of the mesh geometry information 400. In some embodiments, the traversal order may be based on a rule to traverse to a corner adjacent to right (or to the left) of a previously visited corner.

In some embodiments, to generate the encoded attribute indices bitstream, the attribute indices encoder may furthermore determine a face vertex count array 404 and an indices grouping array 406. The face vertex count array 404 may be a one-dimensional (1D) array of size F that stores the number of vertices for each face. For example, in FIG. 4, the polygonal mesh represented by the geometry information 400 has 4 faces, and therefore has an array size of 4. Moreover, values stored in the face vertex count may represent the number of corners that each of the respective polygons contain. For example, the first value "3" in the face vertex count 404 represents three corners of the triangle associated with the triangle. In some embodiments, the indices grouping array 406 may be an array that indicates the geometry indices of the faces that make up the respective faces represented in the face vertex count 404. For example, the first three indices of the indices grouping, "0", "8", and "1" indicates the geometry indices of the triangle associated with the triangle represented by the first value of the face vertex count 404.

Figure 5:
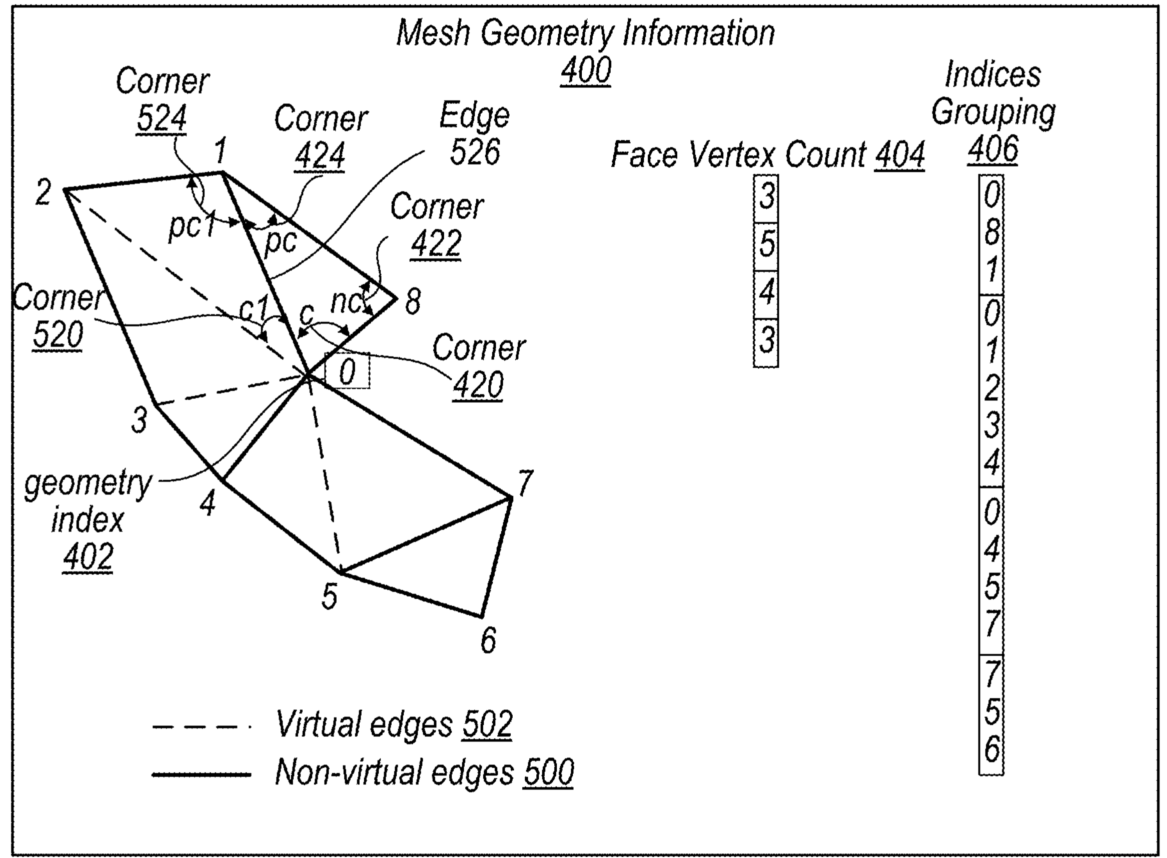
FIG. 5 illustrates example mesh geometry information for a polygonal mesh that contains different types of polygons that may be triangulated using virtual edges to encode/decode corner attributes, according to some embodiments.

In some embodiments, to generate the encoded attribute indices bitstream, the attribute indices encoder may triangulate one or more polygons having more than three edges (e.g., quadrilaterals, pentagons, etc.) represented in the geometry information 400 by using one or more virtual edges according to a virtual edge generation order. For example, FIG. 5 illustrates an example mesh geometry information for polygonal mesh that contain different types of polygons that may be triangulated using virtual edges to encode/decode corner attributes, according to some embodiments.

To generate the encoded attribute indices bitstream, the attribute indices encoder may triangulate the polygonal mesh using virtual edges 502 and determine additional corners that are formed using the virtual edges 502. For example, FIG. 5 illustrates corner "c1" 520 that is generated by triangulating the pentagon comprising geometry vertices indicated by geometry indices "0", "1", "2", "3", and "4". The attribute indices encoder may generate a data structure to describe various corners of the polygons subsequent to the triangulation, in some embodiments. In some embodiments, the attribute indices encoder may furthermore determine a corner-to-index array (a 1D array of size (3×T) that stores for each corner the index of the associated vertex in the indices arrays), vertex-to-corner adjacency information (information indicating for each of the corners of the polygons indices of all the corners incident to it), and edge tag array (a 1D array of size (3×T) that stores for each corner whether its opposite edge is a virtual edge or not).

In some embodiments, to generate the encoded attribute indices bitstream, the attribute indices encoder may encode attribute indices by leveraging data structure (e.g., the corner table) determined above. For example, the attribute indices encoder may determine an array M of size A that stores attribute indices information based on the geometry indices traversal order. Additionally, the attribute indices encoder may determine an array $M^{-1}$ that is an inverse mapping of M. The attribute indices encoder may generate array S of size CC, (wherein CC is the number of corners) which stores for each corner its status whether the corner has been visited in a traversal or not. In some embodiments, the attribute indices encoder may initialize $MM^{-1}=M=\{-1, -1, \ldots, -1\}$, initialize S={false, false, . . . , false}, and initialize an attribute counter C=0.

In some embodiments, the attribute indices encoder may determine the vertex to attribute mappings between respective ones of the plurality of vertices and respective ones of the attribute indices by traversing the geometry vertices according to a traversal order. The attribute indices encoder may traverse each corner c0 and determine whether the corner has been visited during the traversal or not. For example, if S[c0]==true. If the attribute indices encoder determines that S[c0]==true the corner c is skipped since it was already processed. However, if S[c0]==false, the attribute indices encoder set S[c0]=true, and determines attribute index i(c0) associated with the corner c.

If the attribute indices encoder determines that M(i(c0))=−1 (e.g., that the attribute index i(c0) was not visited before), then the attribute indices encoder encodes the value 1 to the encoded attribute indices bitstream to indicate to a decoder that the next attribute is a new attribute. The attribute indices encoder then encodes the attribute index associated with the corner. As discussed above, the value 1 and the attribute index associated with the corner may be encoded using one or more entropy encoders (exponential golomb coding, context adaptive binary arithmetic coding with truncated unary codes, etc.) as discussed above. The attribute indices encoder then sets M(i(c0))=C, $M^{-1}(C)$ =i(k), and increment the counter C=C+1.

If the attribute indices encoder determines that M(i(c0))≠−1 (e.g., that the attribute index i(c0) was visited before), the attribute indices encoder encodes the value 0 to indicate to the decoder that the next attribute is an old attribute and encodes the value (C−M(i(k))−1) into the attribute indices bitstream. The attribute indices encoder then sets c=c0.

In some embodiments, the attribute indices encoder traverses all the corner adjacent to c on its left, wherein c1=geomCornerTable. SwingLeft(c), and determines whether c1<0 or S[c1]==true. If c1<0, this indicates that the corner c1 does not exist (the corner table indicates using −1 that a value does not exist). If [c1]==true, this indicates that the corner has been visited in the traversal. Based on the determination that c1<0 or S[c1]==true. If c1<0 exit the loop and traverses to the next corner according to the traversal order. Otherwise, attribute indices encoder determines the next corner, nc=geomCornerTable.Next(c), and determines whether the edge opposite to nc is not virtual, geomCornerTable.edgeTag(nc)==false.

If the edge opposite to nc is not virtual, the attribute indices encoder may determine that attribute index i(c1) associated with c1 is the same as the attribute index i(c0) associated with c0. For example, based on the determination that edge 526 is not virtual, the attribute indices encoder may determine that two corners (corner pc 424 and corner pc1 524) that are formed using the edge 526 and other edges connected to vertex "1" on an opposite end of the edge 526 are associated with same attribute index. The attribute indices encoder sets attribute index σ=i(c1)==i(c0), pc=geomCornerTable. Previous(c), and pc1=geomCornerTable. SwingRight (pc). The attribute indices encoder then determines if S[pc]==true (e.g., that pc has been visited in the traversal) or (pc1≥0 and S[pc1]==true) (e.g., that pc1 exists and has been visited in the traversal). Based on the determination that, attribute indices encoder sets 00=S[pc]==true and (pc1≥0 and S[pc1]==true) and i(pc1)==i(pc). The attribute indices encoder encodes the Boolean value (σ xor σ0) into the attribute indices encoder bitstream. Based on the determination that S[pc]==false (e.g., that pc has not been visited in the traversal) or (pc1<0 or S[pc1]==false) encode the Boolean value σ. If the edge opposite to nc is not virtual, the attribute indices encoder sets S[c1]=true, sets c=c1, and set c=c0. Once all of the corners to the left of the given corner have been traversed, the same is repeated for corners to the right.

Decoding Corner Attribute Indices Using Corner Table Data Structure

In some embodiments, an encoded attribute indices bitstream may be used by a decoder to reconstruct a volumetric visual content. In some embodiments, the decoder may receive an encoded geometry bitstream, an encoded attribute vector bitstream, and an encoded attribute indices bitstream. As discussed above, to reconstruct a volumetric visual content, the decoder may decode the encoded geometry bitstream to determine mesh geometry information for volumetric visual content, wherein the mesh geometry information comprise position information for a plurality of vertices, geometry connectivity information for forming polygons using the plurality of vertices, and geometry indices for the plurality of vertices.

To decode the encoded geometry bitstream, the decoder may first initialize $M^{-1}=M=\{-1, -1, \ldots, -1\}$, initialize S={false, false, . . . , false}, and initialize an attribute counter C=0. The decoder may then traverse the corners of the polygons represented in the mesh geometry information 400 according to a traversal order. For each corner c0, the decoder may determine if S[c0]==true. If true, the decoder skips corner c since it was already processed. If false, the decoder sets S[c0]=true, determines i(c0) attribute index associated with the corner c, and decode 1 bit from the encoded attribute indices bitstream.

Based on the determination that the decoded bit equals 1, then decoder create a new attribute index i(k)=C+1, append i(k) to the end of ∇(v), and increment the counter C=C+1. Based on the determination that the decoded bit does not equal 1, the decoder reuses an existing attribute index i(k), and decode the value t from the encoded attribute indices bitstream and determines that i(k)=C+1+t. As discussed above, the decoding may be performed using one or more entropy encoders used in the encoding process. To decode the encoded geometry bitstream, the decoder may traverse each corner c0 and determine whether the corner has been visited during the traversal or not. However, instead of encoding the Boolean value into the attribute indices bitstream, the decoder may decode the Boolean value from the attribute indices bitstream. For example, the decoder may decode the Boolean value (σ xor σ0) based on determining that S[pc]==true or (pc1≥0 and S[pc1]==true).

Figure 6:
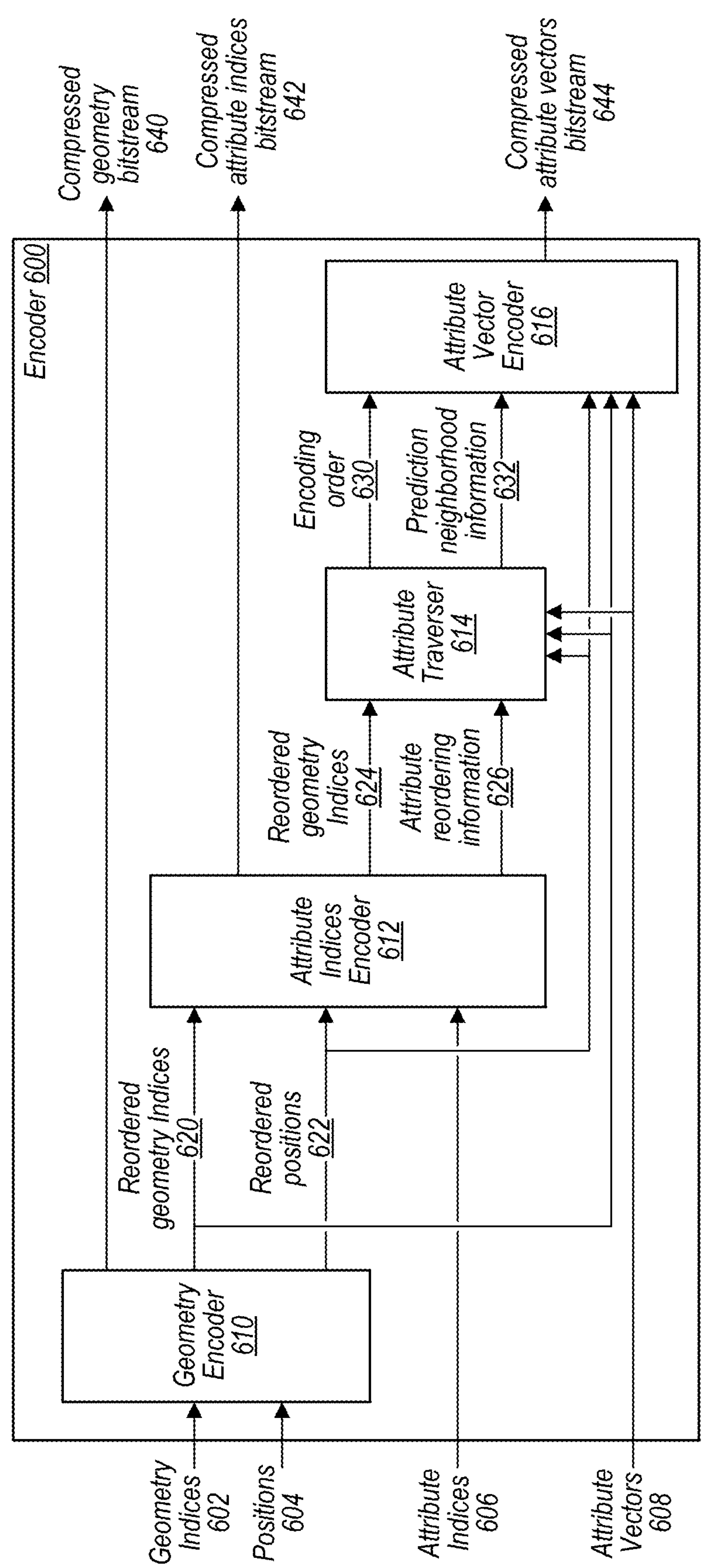
FIG. 6 illustrates an example encoder for compressing and/or encoding visual volumetric content that may be used to encode/decode corner attributes, according to some embodiments.
Figure 7:
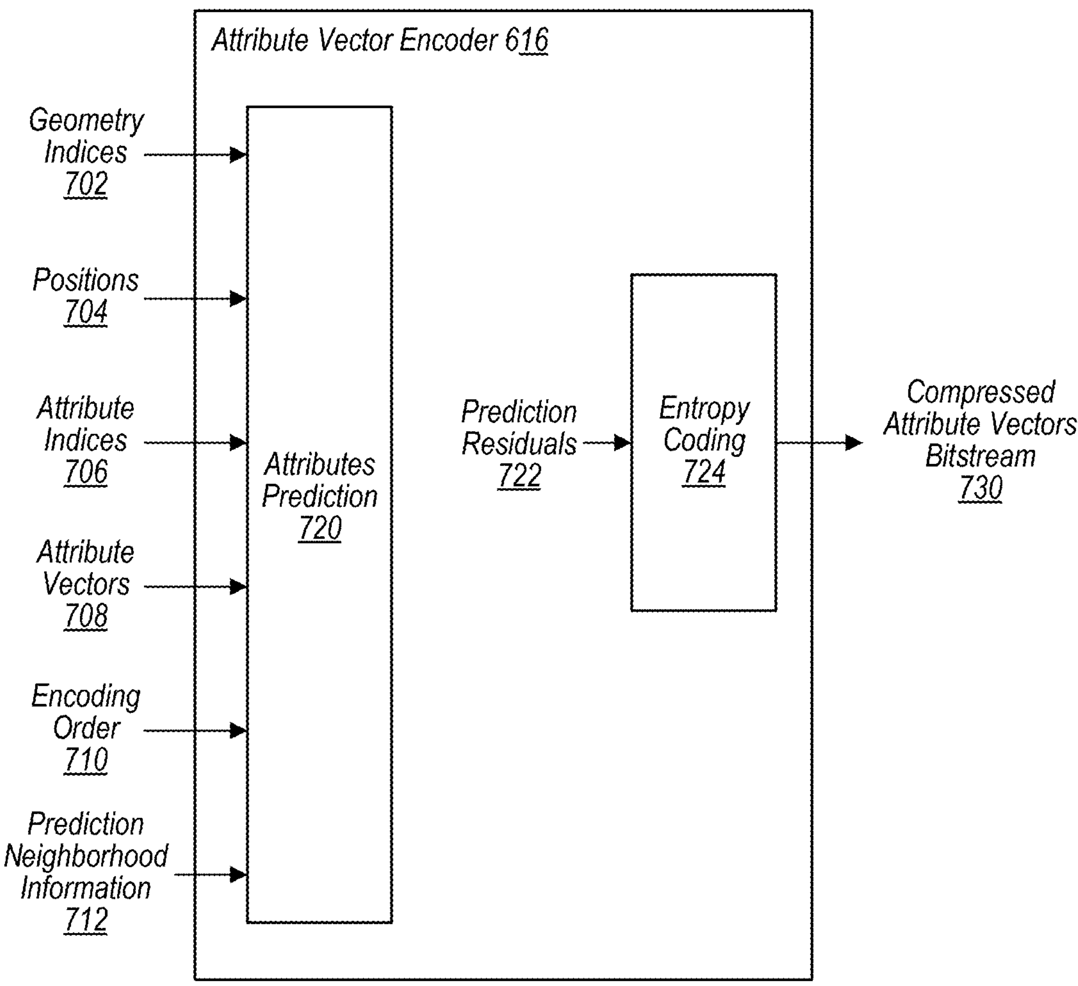
FIG. 7 illustrates an attribute vector encoder that uses an encoding order and prediction neighborhood information to generate a compressed attribute vectors bitstream, according to some embodiments.
Figure 8D:
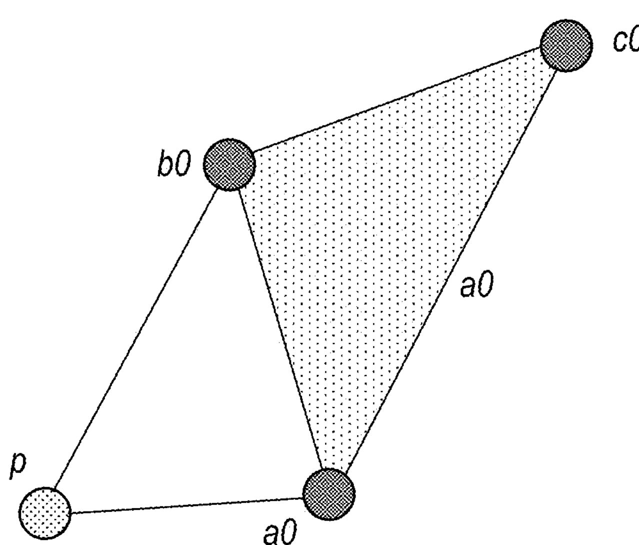

FIG. 6 illustrates an example encoder for compressing and/or encoding visual volumetric content that may be used to encode/decode corner attributes, according to some embodiments.

Example Attribute Traverser

In some embodiments, an attribute traverser 614 determine an encoding order and prediction neighborhood information that may be used by an attribute vector encoder to process attribute values (e.g., attribute vectors) in the same order for the compressed attribute vectors bitstream.

To determine the encoding order, the attribute traverser generates a data structure (e.g., a corner table) that represents a connectivity information for a polygonal mesh as discussed above at FIG. 4. The attribute traverser determines attributeStatus to be an array of size A (where A is the number of attribute vectors) that indicates for each attribute vector whether it was encoded or not. The attribute traverser determines cornerStatus be an array of size CC (where CC is the number of corners) that indicates for each corner whether it was traversed or not. The attribute traverser sets array M be an array of size A that stores the new index of an attribute after re-ordering, and set $M^{-1}$ the inverse mapping of M. In some embodiments, the M and $M^{-1}$ may be computed by the attribute indices encoder 612 as input to the attribute vectors encoder 616.

In some embodiments, an attribute traverse may use the following process to determine an encoding order for corner attributes, as well as prediction neighborhood information.

Initialize attributeStatus={false, false, . . . , false}

Initialize cornerStatus={false, false, . . . , false}

For i=0 . . . A−1

Let j=$M^{-1}$(i) (traverse attributes according to their decoding order

Compute attribute prediction information for attribute vector $a_j$

Encode attribute vector $a_j$

Set attributeStatus[i]=true

Insert index j in the priority queue Q

Various priority criteria could be used to guide the traversal of the mesh, such as:

Valence-based traversal (i.e., priority=the number of traversed corner incident to a vector attribute), Geometry-based (i.e., priority=the sum of Dimond angles associated with traversed corner incident to a vector attribute, cf. for definition of diamond angles and the details of their computation Generation)

While Q is not empty

Extract the highest priority element k of Q

Use the corner table data structure to compute the set of corners ∇(k)={c(0), c(1), . . . , c(N−1)} incidents to the attribute $a_k$ Initialize new AttributeIndices=0

For n=0 . . . N−1.

If cornerStatus[c(k)]==true, then skip this corner

Set c=c(k).

Otherwise, find the left most unprocessed corner of c

For h=0 . . . N lc=cornerTable.swingLeft(c)

If lc>=0 or cornerStatus[lc]==true, exit the loop

Otherwise, c=lc

Starting from corner c, traverse all corners on it is right.

While c>=0 and cornerStatus [c]==true nc=cornerTable.Next(c)

pc=cornerTable.Next(p)

If nc is not in new AttributeIndices, then insert nc in new AttributeIndices

If np is not in newAttributeIndices, then insert np in new AttributeIndices

Update priorities for attribute vectors associated with the two corners nc and pc Update c=cornerTable.swingRight(c)·

Encode the newly traversed attributes

For $a_h$ in new AttributeIndices

If attributeStatus[h]==true, then update the priority of attribute $a_h$

Otherwise,

Compute attribute prediction information for attribute vector $a_h$ (See Section 2)

Encode attribute vector an

Update the priority of attribute an

Set attributeStatus[h]=true

In some embodiments, the attribute prediction information for an attribute $a_h$ consists of zero, one, or two attribute predictors depending on the number of already encoded/decoded neighbors that could be leveraged for prediction. Each attribute predictor stores the following information:

Three attribute indices (α, β, γ),

Their corresponding vertex indices (A, B, Γ), and

The index Φ of a vertex associated attribute $a_h$.

In some embodiments, the predictors are derived as follows:

Use the corner table data structure to compute the set of corners ∇(h)={c(0), c(1), . . . , c(N−1)} incidents to the attribute $a_k$ For c in ∇(h)

Let v be the vertex index associated with the next corner c(n)

nc=cornerTable.Next(c)

pc=cornerTable.Previous(c)

Let na be the index attribute vector associated with the next corner nc

Let pa be the index attribute vector associated with the previous corner pc

Let nv be the vertex index associated with the next corner nc

Let pv be the vertex index associated with the next corner pc

If attributeStatus[na]==true and attributeStatus[pa]==true, then the two attributes na and pa are available for prediction oc=cornerTable.Opposite(c)

Let oa be the index attribute vector associated with the opposite corner oc

If oc≥0 and attributeStatus[oa]==true, then the attributes oa is also available for prediction (3-neighbors predictor)

Store the following predictor ($\alpha$=na, $\beta$=pa, $\gamma$=oa)

(A=nv, B=pv, $\Gamma$=ov), $\Phi$=0

Otherwise, the attributes oa is not available for prediction

Store the following predictor (2-neighbors predictor)

($\alpha$=na, $\beta$=pa, $\gamma$=−1)

(A=nv, B=pv, $\Gamma$=−1), $\Phi$=v

Otherwise, if attributeStatus[na]==true, then only the attributes na is available for prediction Store the following predictor (1-neighbor predictor)

($\alpha$=na, $\beta$=−1, $\gamma$=−1)

(A=nv, B=−1, $\Gamma$=−1), $\Phi$=v

Otherwise, if attributeStatus[pa]==true, then only the attributes pa is available for prediction Store the following predictor ($\alpha$=pa, $\beta$=−1, $\gamma$=−1)

(A=pv, B=−1, $\Gamma$=−1), $\Phi$=v

In some embodiments, the generated predictors are stored in a local priority queue of size NQ=2. A predictor is inserted in the queue if and only if:

The queue is not full, or

The predictor leverages a higher number of neighboring attributes (i.e., 3-neighbor predictors have a higher priority than 2-neighbor predictors, which have a higher priority than 1-neighbor predictors).

Attribute Vector Encoding

In some embodiments, an attribute vector encoder, such as attribute vector encoder 416, takes as inputs reordered position and geometry indices, such as produced by the geometry encoder block, as well as a determined encoding order (e.g., traversal order), prediction neighborhood information, and the attribute vectors themselves (that are to be encoded). Since the attribute vector encoding is downstream of the attributes indices encoder 412 and the attribute traverser 414, the attribute vector encoder 416 may treat vertex attributes and corner attributes in a similar manner. For example, for vertex attributes the attribute indices encoder and the attribute traverser blocks of the overall encoder are simply passthrough blocks since vertex attributes use the same connectivity and the same encoding order as the ones used for geometry encoding. Also, the corner attributes have already been handled by the attribute indices encoder 412 and the attribute traverser 416.

In some embodiments attribute vectors may be encoded using a two-step process, wherein the attribute vectors are first predicted (using a signaled prediction configuration) and wherein prediction residuals are further entropy encoded.

As an initial prediction step, an attribute vector for a seed vertex of an interconnected component may be predicted, for example, using one or more previously processed seed vertices attribute vectors and a determined prediction configuration.

For example, let K be the number of connected components (CCs) in the mesh and $(S_k)_{k=\{0, \ldots, K-1\}}$ the indices of the first vertex to be encoded in each CC (e.g., the seed for each CC).

A cache cache C of a predefined size (e.g., 4, 8, or 16) is maintained, which keeps track of the last N CC seeds. The cache is initially empty. Every time a CC seed is encoded, its index is added to C. If C is full the oldest seed is evicted from C. In some embodiments, other strategies for considering insertion and eviction of seed indices in C may be considered, such as if a new seed is too close in terms of 3D position to existing seeds it may not be inserted in C or it may be removed from C.

The predictors from the cache to be used in predicting a seed vertex according to a given one of the prediction configurations shown in FIGS. 8A-8E may be selected, e.g., a subset $\Sigma$ of size M of the indices in C. The sub-set may be a fixed selection or may be an adaptive selection that maximizes the 3D coverage of the selected seeds used to predict the next seed vertex.

In some embodiments, both the encoder determines the index k of the best predictor in 2 for example based on:

Minimizing the number of bits used to encode the prediction residual and the index k.

Rate-Distortion performance in case of lossy compression.

Minimizing other metrics used as proxy for the number of bits of the RD performance (e.g., $L^1$, $L^2$, $L^k$, and $L^\infty$ norms of the prediction residual)

The index k is signaled and indicates a given one of the prediction configurations shown in FIGS. 8A-8E that are to be used.

Also, in some embodiments, various prediction modes may be used for a selected prediction configuration. For example, single-way prediction may use one of the following modes:

Single-way prediction

Mode0={SPred0, SPred4, SPred5, SPred6}

Mode1={SPred1, SPred4, SPred5, SPred6}

Mode2={SPred2, SPred4, SPred5, SPred6}

Mode3={SPred3, SPred4, SPred5, SPred6}

Also, multi-way prediction may use one of the following modes:

Multi-way prediction

Mode0={MPred0, SPred8, MPred9, MPred10}

Mode1={MPred1, MPred8, MPred9, MPred10}

Mode2={MPred2, MPred8, MPred9, MPred10}

Mode3={MPred3, MPred8, MPred9, MPred10}

Mode4={MPred4, MPred8, MPred9, MPred10}

Mode5={MPred5, MPred8, MPred9, MPred10}

Mode6={MPred6, MPred8, MPred9, MPred10}

Mode7={MPred7, MPred8, MPred9, MPred10}

In some embodiments, the encoder may switch between prediction modes with a predefined update period. For example, the same single-way and multi-way modes may be used for V-consecutive predictions. Then, after V predictions, the prediction mode may be updated for example by:

explicitly writing in the bitstream the index of the new prediction mode; or implicitly a deterministic update strategy may be used that considers the performance of the various modes observed over the last prediction period or over a subset of the already encoded vertices, or over all the encoded vertices so far.

For each vertex, the encoder:

determines the index k of the best predictor from the list of predictors of the current prediction mode Minimize the number of bits used to encode the prediction residual and the index k.

Rate-Distortion performance in case of lossy compression

Minimize other metrics used as proxy for the number of bits of the RD performance (e.g., $L^1$, $L^2$, $L^k$, and $L^\infty$ norms of the prediction residual)

Encode the index k

Arithmetic coding

Entropy coding

Universal codes

. . .

Encode the residuals

In some embodiments, binarization may be used to encode the prediction configuration and/or prediction mode to be used to predict the seed vertices and/or to encode the prediction residuals.

Encoding the prediction mode index encode the bits from the most significant bit to the least significant bit encode the most significant bit with the binary arithmetic context 0 encode the k-th bit with the binary arithmetic context selected based on the values of the last (k−1) encoded bits Encoding of the predictor index Encoding process Encode one bit to specify if the predictor index is 0 if it is not 0, encode one bit to specify if the predictor index is 1 if it is not 2, encode one bit to specify if 2 or 3

In some embodiments, an arithmetic context selection may be used for the binarization encoding, wherein different contexts are maintained for each of the prediction configurations. Also, different context may be used based on the shapes of the adjacent triangles.

Example Computer System

Figure 9:
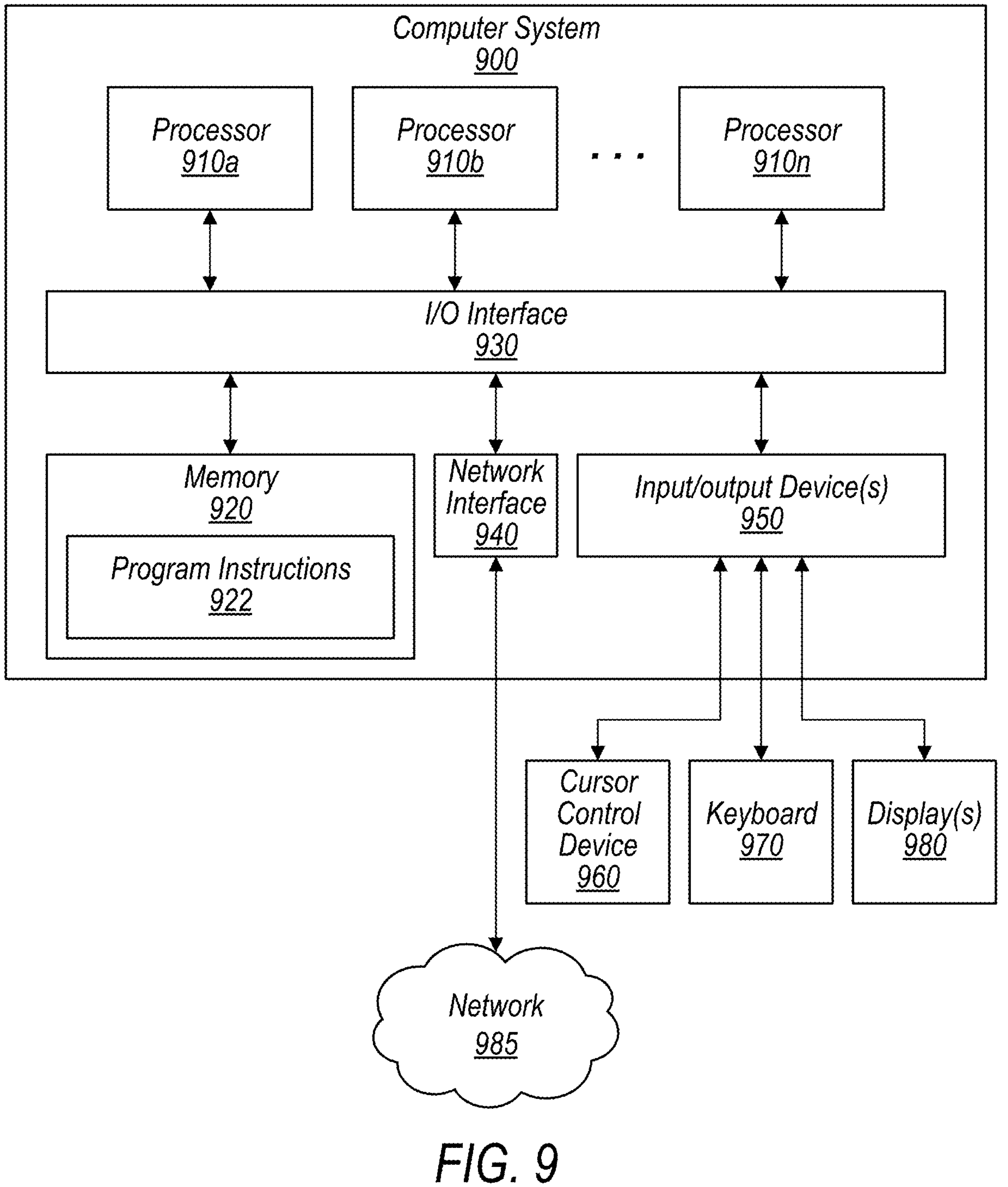
FIG. 9 illustrates an example computer system that may implement an encoder or decoder, according to some embodiments.

FIG. 9 illustrates exemplary computer system 900 usable to implement an encoder or decoder as described above with reference to FIGS. 1-8). In different embodiments, computer system 900 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed using one or more computer systems 900, which may interact with various other devices. Note that any component, action, or functionality described above with respect to FIGS. 1-8 may be implemented using one or more computers such as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, computer system 900 may be implemented as a system on a chip (SoC). For example, in some embodiments, processors 910, memory 920, I/O interface 930 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 920 may be configured to store compression or decompression program instructions 922 and/or sensor data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions 922 may be configured to implement an encoder or decoder application incorporating any of the functionality described above. In some embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included.

Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed using one or more processors of an encoder, cause the one or more processors to:

obtain mesh geometry information for volumetric visual content, wherein the mesh geometry information comprise:

position information for a plurality of vertices, geometry connectivity information for forming polygons using the plurality of vertices, and geometry indices for the plurality of vertices;

obtain attribute information for the volumetric visual content, wherein the attribute information comprise:

attribute connectivity information for associating attribute vectors with the plurality of vertices; and attribute indices for the attribute vectors;

generate a data structure representing the polygons using the mesh geometry information, wherein the data structure indicates for respective corners of the polygons:

respective corner indices, respective vertices of the plurality of vertices, and relationships between the respective corners and other corners adjacent to the respective corners;

encode the attribute indices using a traversal order for the respective corners of the polygons, wherein the encoded attribute indices are arranged according to the traversal order; and send an encoded attribute indices bitstream configured to be decoded to reconstruct the volumetric visual content, wherein the encoded attribute indices bitstream comprises the encoded attribute indices.

2. The non-transitory computer-readable medium of claim 1, wherein:

the polygons comprise one or more polygons having more than three edges; and to encode the attribute indices the program instructions, when executed using the one or more processors of the encoder, cause the one or more processors to:

triangulate the one or more polygons having more than three edges using one or more virtual edges according to a virtual edge generation order; and determine, for the respective corners, whether respective opposite edges are virtual.

3. The non-transitory computer-readable medium of claim 2, wherein to encode the attribute indices the program instructions, when executed using the one or more processors of the encoder, cause the one or more processors to:

initiate traversal of corners of the polygons according to the traversal order, wherein for each corner of the corners being traversed:

determine whether an attribute index of the attribute indices associated with a given corner has been visited in the traversal; and based on the determination that the attribute index has not been visited in the traversal, encode the attribute index.

4. The non-transitory computer-readable medium of claim 3, wherein:

the traversal order is based on a rule to traverse to a corner adjacent to right or left of a previously visited corner; and to encode the attribute indices the program instructions, when executed using the one or more processors of the encoder, cause the one or more processors to:

determine whether an edge between the previously visited corner and the corner adjacent to the right or the left of the previously visited corner is virtual.

5. The non-transitory computer-readable medium of claim 4, wherein to encode the attribute indices the program instructions, when executed using the one or more processors of the encoder, cause the one or more processors to:

based on the determination that the edge is not virtual, determine whether two corners formed using the edge and other edges connected to a vertex on an opposite end of the edge from the given corner are associated with same attribute index; and based on the determination that the two corners are associated with the same attribute index, encode a value indicating that attribute indices for the previously visited corner and the corner adjacent to the right or the left of the previously visited corner are the same.

6. The non-transitory computer-readable medium of claim 3, wherein for the each corner of the corners being traversed the attribute index is encoded using one or more entropy encoders.

7. The non-transitory computer-readable medium of claim 6, wherein the one or more entropy encoders comprise one or more of:

an Exponential Golomb coding; and a context adaptive binary arithmetic coding.

8. The non-transitory computer-readable medium of claim 1, wherein:

the attribute information for the volumetric visual content comprise a two-dimensional (2D) texture image; and the attribute vectors comprise coordinates of the 2D texture image.

9. The non-transitory computer-readable medium of claim 8, wherein:

the 2D texture image is an image of an unfolded three-dimensional (3D) mesh; and multiple ones of the coordinates of the 2D texture image are associated with a same geometry index of the geometry indices for the plurality of vertices.

10. The non-transitory computer-readable medium of claim 1, wherein the attribute vectors comprise three-dimensional (3D) vectors representing one or more attributes of surfaces of the polygons formed using the plurality of vertices.

11. A non-transitory computer-readable medium storing program instructions that, when executed using one or more processors of a decoder, cause the one or more processors to:

receive encoded volumetric visual content, the encoded volumetric visual content comprising:

an encoded geometry bitstream, an encoded attribute vector bitstream, and an encoded attribute indices bitstream;

decode the encoded geometry bitstream to determine mesh geometry information for volumetric visual content, wherein the mesh geometry information comprise:

position information for a plurality of vertices, geometry connectivity information for forming polygons using the plurality of vertices, and geometry indices for the plurality of vertices;

decode the encoded attribute vector bitstream to determine attribute vectors associated with the plurality of vertices;

generate a data structure representing the polygons using the mesh geometry information, wherein the data structure indicates for respective corners of the polygons:

respective corner indices, respective vertices of the plurality of vertices, and relationships between the respective corners and other corners adjacent to the respective corners;

decode, using a traversal order for the respective corners of the polygons, the encoded attribute indices bitstream to determine attribute indices for the respective vertices of the plurality of vertices; and reconstruct the volumetric visual content using:

the mesh geometry information, the attribute vectors, and the attribute indices.

12. The non-transitory computer-readable medium of claim 11, wherein:

the polygons comprise one or more polygons having more than three edges; and to decode the attribute indices the program instructions, when executed using the one or more processors, cause the one or more processors to:

triangulate the one or more polygons having more than three edges using one or more virtual edges according to a virtual edge generation order; and determine, for the respective corners, whether respective opposite edges are virtual.

13. The non-transitory computer-readable medium of claim 12, wherein to decode the attribute indices the program instructions, when executed using the one or more processors, cause the one or more processors to:

initiate traversal of corners of the polygons according to the traversal order, wherein for each corner of the corners being traversed:

determine whether an attribute index of the attribute indices associated with a given corner has been visited in the traversal; and based on the determination that the attribute index has not been visited in the traversal, decode, from the encoded attribute indices bitstream, the attribute index for a vertex associated with the given corner.

14. The non-transitory computer-readable medium of claim 13, wherein:

the traversal order is based on a rule to traverse to a corner adjacent to right or left of a previously visited corner; and to decode the attribute indices the program instructions, when executed using the one or more processors, cause the one or more processors to:

determine whether an edge between the previously visited corner and the corner adjacent to the right or the left of the previously visited corner is virtual.

15. The non-transitory computer-readable medium of claim 14, wherein to encode the attribute indices the program instructions, when executed using the one or more processors, cause the one or more processors to:

based on the determination that the edge is not virtual, determine whether two corners formed using the edge and other edges connected to a vertex on an opposite end of the edge from the given corner are associated with same attribute index; and based on the determination that the two corners are associated with the same attribute index, decode a value indicating that attribute indices for the previously visited corner and the corner adjacent to the right or the left of the previously visited corner are the same.

16. The non-transitory computer-readable medium of claim 14, wherein for the each corner of the corners being traversed the attribute index is decoded using one or more entropy encoders.

17. The non-transitory computer-readable medium of claim 16, wherein the one or more entropy encoders comprise one or more of:

an Exponential Golomb coding; and a context adaptive binary arithmetic coding.

18. The non-transitory computer-readable medium of claim 11, wherein:

the attribute information for the volumetric visual content comprises a two-dimensional (2D) texture image; and the attribute vectors comprise coordinates of the 2D texture image.

19. The non-transitory computer-readable medium of claim 18, wherein:

the 2D texture image is an image of an unfolded three-dimensional (3D) mesh; and multiple ones of the coordinates of the 2D texture image are associated with a same geometry index of the geometry indices for the plurality of vertices.

20. A device comprising:

one or more processors; and non-transitory computer-readable medium storing program instructions that, when executed using one or more processors of a decoder, cause the one or more processors to:

receive encoded volumetric visual content, the encoded volumetric visual content comprising:

an encoded geometry bitstream, an encoded attribute vector bitstream, and an encoded attribute indices bitstream;

decode the encoded geometry bitstream to determine mesh geometry information for volumetric visual content, wherein the mesh geometry information comprise:

position information for a plurality of vertices, geometry connectivity information for forming polygons using the plurality of vertices, and geometry indices for the plurality of vertices;

decode the encoded attribute vector bitstream to determine attribute vectors associated with the plurality of vertices;

generate a data structure representing the polygons using the mesh geometry information, wherein the data structure indicates for respective corners of the polygons:

respective corner indices, respective vertices of the plurality of vertices, and relationships between the respective corners and other corners adjacent to the respective corners;

decode, using a traversal order for the respective corners of the polygons, the encoded attribute indices bitstream to determine attribute indices for the respective vertices of the plurality of vertices; and reconstruct the volumetric visual content using:

the mesh geometry information, the attribute vectors, and the attribute indices.

* * * * *